UNITED STATES PATENT OFFICE 2,104,264

PAINT COMPOSITION

Paul La Frone Magill and Charles Dangelmajer, Niagara Falls, N. Y., assignors to E. I. du Pont de Nemours & Company, Wilmington, Del., a corporation of Delaware No Drawing. Application November 8, 1934,
Serial No. 752,116

5 Claims. (Cl. 134—54)

This invention relates to paint compositions and more particularly to base paints.

For many purposes, it is desirable to apply a paint coating which when dry will shed water but will be permeable to water vapor. For example, paints applied to green concrete and incompletely dried plaster must possess sufficient permeability to permit the continued elimination of water from the material painted. The ordinary oil paints are not suitable for such purposes because they form impermeable coatings on drying and the continued elimination of moisture tends to cause the paint to peel. The usual forms of casein paints, containing casein dissolved in aqueous alkaline solutions, do not possess satisfactory water resistance along with a satisfactory working life or physical properties entirely suitable for their easy application.

It is the object of this invention to provide paint compositions which produce films of satisfactory permeability to water vapor and which readily shed liquid water and which are characterized by ease of application. Other objects will be hereinafter apparent.

These objects are accomplished by using formamide in combination with suitable binding agents, pigments, and other materials. Aqueous paints, especially suitable for painting porous surfaces such as plaster or concrete, may be made according to our invention by dissolving casein in formamide and water and incorporating therewith suitable pigments. If desired, various binding materials other than casein may be added, as will be apparent to those skilled in the art of paint making. Examples of such materials are starches, cumaron resin, e. g. in benzene solution, gums, dextrin, glue, gelatine and rubber latex. We may also use such binding materials in place of casein, although for many purposes, the presence of casein is preferable.

In one modification of our invention, we mix water, formamide and a binding material, e. g., casein with rubber latex. Another modification comprises adding to a water-formamide-binding material mixture various desirable substances which by reason of the presence of the formamide, may be readily emulsified with the mixture, e. g., waxes, oils (preferably drying oils) or cellulose acetate.

The presence of formamide in aqueous paint mixtures aids in maintaining solid ingredients in suspendable state and assists in maintaining emulsions when oils or like materials are present. The formamide also aids in dissolving or suspending colloidal binding agents such as casein, gums, etc. A further advantage of the formamide is that it prevents putrefaction of substances such as casein, gums, starch and the like. The amount of formamide used will vary, depending on the nature of the other ingredients of the paint and the properties or quality desired in the product. Preferably, we employ 10 to 60% by weight of formamide in the paint mixture. Our invention is illustrated by the following examples:

Example 1

A mixture was made containing 70 grams of casein, 70 cc. of formamide, 150 cc. of water, 10 cc. of 20% aqueous ammonia. This was mixed cold and then heated to 90° C. and filtered. To this there was then added 150 cc. of rubber latex containing 38% dry rubber. 300 grams of this mixture were mixed with 30 cc. of rubber latex containing 38% dry rubber, 100 grams of powdered zirconium oxide, 6 grams of ultramarine and 20 grams of ocher, and the mixture stirred to a smooth uniform paint. This paint was then applied to shingles, concrete, cloth, paper and wood and produced a satisfactory coating, permeable to water vapor.

Example 2

300 grams of casein, 300 grams of formamide, 800 cc. of water and 20 cc. of 20% ammonia were mixed cold and then heated to 80° C. 250 grams of this solution were then mixed with 25 grams of linseed oil, 10 grams of castor oil, 100 grams of powdered zirconium oxide, 5 grams of lead chromate and 1.5 grams of ultramarine. The whole mixture was stirred to obtain a uniform suspension of the pigments and a good emulsion of the oils. It was then applied to concrete, wood, paper and metal surfaces. The paint produced a satisfactory coating.

Example 3

60 grams of casein, 75 cc. of formamide and 125 cc. of water were mixed at room temperature and heated to 80° C. The solution was cooled to 30° C. and there was added 75 grams of rubber latex containing 38% dry rubber. To 40 grams of this solution there was mixed with good stirring 25 grams of calcium carbonate. The resulting paint was then applied to cloth surfaces to produce a tough adherent film.

Our formamide paints are useful for coating concrete, plaster, wall board, moist wooden surfaces and as general utility paints. They are easily applied by brushing or sponging, having good flowing characteristics. They have good stability, that is, they do not deteriorate during storage.

We claim:

1. A water paint containing water, pigment, casein and 10 to 60% by weight of formamide.

2. A water paint comprising water, casein, formamide, rubber latex, ammonia and zirconium oxide.

3. A water paint comprising pigment and an emulsion of a drying oil in a water solution containing formamide and a binding agent.

4. A water paint comprising pigment and an emulsion of a drying oil in a water solution containing formamide and casein.

5. A water paint comprising an emulsion of linseed and castor oil in a water solution of casein and formamide, with added pigment.

PAUL LA FRONE MAGILL.
CHARLES DANGELMAJER.